(12) United States Patent
Hawa et al.

(10) Patent No.: US 11,355,822 B2
(45) Date of Patent: Jun. 7, 2022

(54) BATTERY PEEL OFF ASSEMBLY FOR EXPOSING A SAFETY FEATURE COMPRISING AN AVERSIVE AGENT

(71) Applicant: DURACELL U.S. OPERATIONS, INC., Wilmington, DE (US)

(72) Inventors: Azmi Hawa, Danbury, CT (US); Jonathan Tse, Troinex (CH); Rolf Schmitz, Mies (CH)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 321 days.

(21) Appl. No.: 16/750,961

(22) Filed: Jan. 23, 2020

(65) Prior Publication Data

US 2021/0234144 A1    Jul. 29, 2021

(51) Int. Cl.
*H01M 10/04* (2006.01)
*B32B 7/06* (2019.01)
*B32B 7/12* (2006.01)
*B32B 29/00* (2006.01)
*B32B 27/30* (2006.01)
(Continued)

(52) U.S. Cl.
CPC ............. *H01M 50/572* (2021.01); *B32B 7/06* (2013.01); *B32B 7/12* (2013.01); *B32B 27/308* (2013.01); *B32B 27/36* (2013.01); *B32B 29/00* (2013.01); *H01M 10/0427* (2013.01); *H01M 50/543* (2021.01); *B32B 2250/05* (2013.01); *B32B 2307/748* (2013.01); *B32B 2457/10* (2013.01); *H01M 2200/00* (2013.01); *H01M 2220/30* (2013.01)

(58) Field of Classification Search
CPC .................................................. B32B 2457/10
See application file for complete search history.

(56) References Cited

U.S. PATENT DOCUMENTS 9,865,862 B2    1/2018  Ok
2009/0009976 A1    1/2009  Nishikawa et al.

FOREIGN PATENT DOCUMENTS

CN    106753002 A    5/2017
GB      2254806 B    5/1995
(Continued)

OTHER PUBLICATIONS

European Patent Application No. 20214547.0, European Search Report, dated May 11, 2021.

*Primary Examiner* — Ian A Rummel
(74) *Attorney, Agent, or Firm* — Marshall, Gerstein & Borun LLP

(57) ABSTRACT

A peel off assembly for exposing a safety feature comprising an aversive agent for a battery includes a first adhesive layer adhered to a base layer. Optionally, a layer comprising a colorant is disposed over and coupled to the first adhesive layer. A layer comprising a water-soluble material and an aversive agent is disposed over and coupled to the first adhesive layer. A second adhesive layer is disposed over and coupled to the layer comprising a water-soluble material. A kill strip layer is disposed between the second adhesive layer and the base layer. Optionally, a label is disposed over and coupled to the second adhesive layer. The second adhesive layer is adapted and arranged to release from the layer comprising the water-soluble material, when a peel force is applied such that the second adhesive layer and the kill strip layer are removable from the layer comprising a water-soluble material when the peel force is applied to the second adhesive layer.

24 Claims, 2 Drawing Sheets

(51) Int. Cl.
*B32B 27/36* (2006.01)
*H01M 50/572* (2021.01)
*H01M 50/543* (2021.01)

(56) References Cited

FOREIGN PATENT DOCUMENTS

| | | |
|---|---|---|
| GB | 2254807 B | 5/1995 |
| JP | S5929353 A | 2/1984 |
| JP | S5953762 U | 4/1984 |
| JP | 5736730 B2 | 6/2015 |
| JP | 2016-108426 A | 6/2016 |

BATTERY PEEL OFF ASSEMBLY FOR EXPOSING A SAFETY FEATURE COMPRISING AN AVERSIVE AGENT

FIELD OF THE INVENTION

The disclosure relates generally to stickers for batteries and, more specifically, relates to a battery cell peel off assembly for exposing a safety feature comprising an aversive agent.

BACKGROUND OF THE INVENTION

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode. The battery components are disposed in a can, or housing, that is typically made from metal.

When a battery is used as an electrical energy source in an electronic device, electrical contact is made to the anode and the cathode, thereby completing a circuit that allows electrons to flow through the device, and which results in respective oxidation and reduction reactions that produce electrical power to the electronic device. An electrolyte is in contact with the anode, the cathode, and the separator. The electrolyte contains ions that flow through the separator between the anode and cathode to maintain charge balance throughout the battery during discharge.

There is a growing need for portable power for electronic devices such as toys; remote controls; audio devices; flashlights; digital cameras and peripheral photography equipment; electronic games; toothbrushes; radios; clocks, and other portable electronic devices. Consumers need to have power readily available for these electronic devices. As battery technology improves and more powerful batteries are developed, smaller batteries are more prevalent, especially in toys and small hand held devices. As a result, smaller batteries often referred to as button cells and/or as coin cells are becoming more popular.

While button cell batteries are common in many portable consumer electronic devices, the size, shape, and appearance of these batteries, particularly coin cells having a diameter of 20 mm such as 2016 lithium cells, 2025 lithium cells, and 2032 lithium cells, can pose swallowing dangers, particularly to infants, toddlers, and pets due to similarities in size of the esophagus of infants, toddlers, and pets and the coin cells. These dangers can result in bodily harm, especially if the cell is swallowed unbeknownst to others around. Additionally, some of these button cell batteries can pose a relatively greater danger than others, which consumers may not fully appreciate. For example, coin cell batteries such as 2016 3V lithium cells, 2025 3V lithium cells, and 2032 3V lithium cells, can cause electrolysis of body fluids and/or burning of wet esophageal/organ tissue, for example, if swallowed.

SUMMARY OF THE INVENTION

According to one aspect, a peel off assembly for exposing a safety feature comprising an aversive agent for a battery includes a first adhesive layer adhered to a base layer. A layer comprising a colorant is optionally disposed over and coupled to the first adhesive layer. A layer comprising a water-soluble material and an aversive agent is disposed over and coupled to the first adhesive layer. A second adhesive layer is disposed over and coupled to the layer comprising a water-soluble material, and a label is optionally disposed over and coupled to the second adhesive layer. A kill strip layer is disposed between the second adhesive layer and the base layer, and the second adhesive layer is adapted and arranged to release from the layer comprising the water-soluble material when a peel force is applied by peeling a portion of the kill strip layer away from the base layer such that the second adhesive layer is decoupled from the layer comprising a water-soluble material. The label (when present), the second adhesive layer, and the kill strip layer are removable from a sub-assembly comprising the layer comprising a water-soluble material, the layer comprising a colorant (when present), and the first adhesive layer when the peel force is applied to the kill strip layer.

According to another aspect, a battery safety system includes a battery having a can, a first terminal and a second terminal, and a peel off assembly for exposing a safety feature comprising an aversive agent adhered to one of the first or second terminals. The peel off assembly includes a first adhesive layer adhered to the one of the first or second terminals, optionally, a layer comprising a colorant disposed over and coupled to the first adhesive layer, a layer comprising a water-soluble material and an aversive agent disposed over and coupled to the first adhesive layer, a second adhesive layer disposed over and coupled to the layer comprising a water-soluble material, a kill strip layer disposed between the second adhesive layer and the one of the first or second terminals, and the second adhesive layer is adapted and arranged to release from the layer comprising the water-soluble material when a peel force is applied by peeling a portion of the kill strip layer away from the one of the first or second terminals such that the second adhesive layer is decoupled from the layer comprising a water-soluble material and, optionally, a label disposed over and coupled to the second adhesive layer. The label (when present), the second adhesive layer, and the kill strip layer are removable from a sub-assembly comprising the layer comprising a water-soluble material, the layer comprising a colorant (when present), and the first adhesive layer when the peel force is applied to the kill strip layer.

In accordance with the teachings of the disclosure, any one or more of the foregoing aspects of a peel off assembly for exposing a safety feature comprising an aversive agent for a battery or a battery safety system may further include any one or more of the following features.

In some optional forms, the base layer comprises a plastic film, a coated paper sheet such as a wax paper sheet, or a laminate including a top layer comprising a plastic film or a coated paper, or a combination thereof. In yet other aspects, the base layer comprises a battery pole such as, for example, a negative terminal or a positive terminal of a battery. In various refinements, the battery pole includes a first inner portion and a second outer portion, and the first adhesive layer is disposed over and coupled to the second outer portion and the kill strip layer at least partially overlays the first inner portion. In one example, the second outer portion comprises an annular shape and the layer comprising a water-soluble material and the layer comprising the colorant (when present) are provided in the shape of an annulus (a complete ring around the battery 12). In a further example, the second outer portion comprises an annular shape and the layer comprising a water-soluble material and the layer comprising the colorant (when present) are provided in the shape of an annular sector. The annular sector has an angle that is less than or equal to 360 degrees, for example, less than or equal to 180 degrees. In yet other refinements, the first inner portion comprises a no print zone of the battery pole. In yet other refinements, the first inner portion comprises a diameter of about 11 mm or less.

In yet other optional forms, the colorant comprises a dye, a pigment, a polymeric dye, or a combination thereof. In some refinements, the layer comprising a colorant comprises a water based ink. In yet other refinements, the water based ink comprises a black dye.

In yet other optional forms, the water-soluble material comprises an aversive agent. In some refinements, the aversive agent comprises a bitterant. In some refinements, the water-soluble material comprises greater than about 200 ppm, for example, between about 200 ppm and 20000 ppm, such as about 500 ppm, about 1000 ppm, about 2500 ppm, about 5000 ppm, about 10000 ppm, about 15000 ppm, or about 20000 ppm of the aversive agent, e.g., denatonium benzoate.

In yet other optional forms, the kill strip layer comprises the shape of a circular segment. In some refinements, the circular segment comprises an arc of less than 180 degrees. In yet other refinements, the kill strip layer comprises an area that is less than one half of an area of the label. In some refinements, the kill strip layer comprises a non-metalized polyester.

In yet other optional forms, the first adhesive layer comprises a relatively high surface energy acrylic adhesive.

In yet other optional forms, the first adhesive layer is substantially free of polyvinyl alcohol.

In yet other optional forms, the second adhesive layer comprises a solvent acrylic adhesive.

BRIEF DESCRIPTION OF THE DRAWINGS

While the specification concludes with claims particularly pointing out and distinctly claiming the subject matter, the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries (or disposable batteries) are described, for example, in David Linden, *Handbook of Batteries* ($4^{th}$ ed. 2011). Secondary batteries (or rechargeable batteries) are intended to be recharged and used over and over again. Secondary batteries may be discharged and recharged many times, e.g., more than fifty times, more than a hundred times, or more. Secondary batteries are described, for example, in David Linden, *Handbook of Batteries* ($4^{th}$ ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries of aqueous, nonaqueous, ionic liquid, and solid state systems. Primary and secondary batteries of the aforementioned systems are thus within the scope of this application and the invention is not limited to any particular embodiment.

Generally, the peel off assemblies for exposing a safety feature comprising an aversive agent described herein provide one or more safety mechanisms that help prevent and/or identify ingestion of the battery by a human (such as a child). The peel off assemblies include an aversive agent (which, for example, may induce a child to spit the battery out of the body due to an unpleasant taste). Additionally, the peel off assemblies may include a layer comprising a colorant (e.g., a dye, a pigment, a polymeric dye, or a combination thereof) that signals to a consumer that a film is present on the battery. In some embodiments, the layer comprising a colorant and thus the colorant itself may dissolve and/or become dispersed when contacted with bodily fluids, such as saliva, such that a colored fluid deposits on the skin of the child, which advantageously allows an adult to rapidly identify the child's potential ingestion of the battery. The peel off assemblies may also include text and/or graphical descriptions of the safety features on a peel off portion, which must be removed before the battery may be used to provide electrical power in a device.

Figure 1:
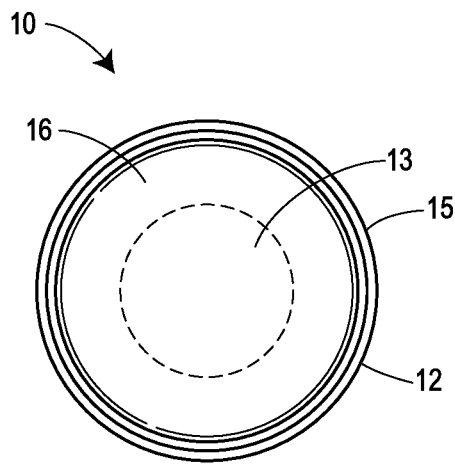
FIG. 1 is a top plan view of a battery cell with a peel off assembly for exposing a safety feature comprising an aversive agent constructed in accordance with the teachings of the disclosure.
Figure 2:
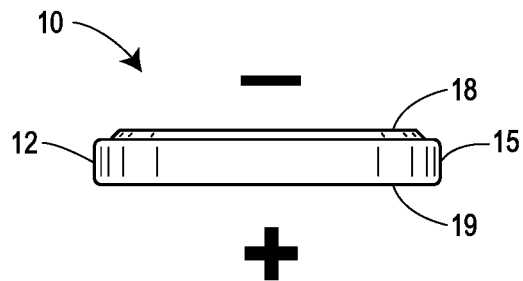
FIG. 2 is a side view of the battery cell and peel off assembly for exposing a safety feature comprising an aversive agent of FIG. 1.

Referring to FIGS. 1 and 2, a peel off assembly for exposing a safety feature comprising an aversive agent 10 for a battery 12 is illustrated. In the illustrated embodiment, the peel off assembly 10 is attached to the negative terminal 18 (corresponding to an anode) of the battery 12. A battery can or housing 15 forms an outer surface of the battery 12. In other embodiments, the peel off assembly 10 may be attached to the positive terminal 20 (corresponding to a cathode) of the battery 12. As used herein, the terms "pole" and "terminal" are used interchangeably. In some embodiments, the battery 12 may comprise a coin cell or a button cell. For example, the battery 12 may comprise a lithium coin cell battery such as, for example, 2016 3V lithium cells, 2025 3V lithium cells, and 2032 3V lithium cells. In some embodiments, the battery 12 may comprise an outer diameter between about 16 mm and about 24 mm, for example, about 20 mm. In some embodiments, a terminal 18 of the battery 12 may include a first inner portion 13, for example a no print zone, that in some cases may have a diameter of about 11 mm or less. As used herein, a "no print zone" is a portion of the battery terminal 18 in which the manufacturer prohibits direct application of print, adhesive, or lamination to ensure proper electrical contact is made when the battery is installed in a battery powered device. The first inner portion 13 may be surrounded by a second outer portion 16 having an annular shape. In some embodiments, the second outer portion 16 may have an outer diameter of about 20 mm and an inner diameter of about 11 mm. In other embodiments, other battery types and/or dimensions may be employed.

Figure 3:
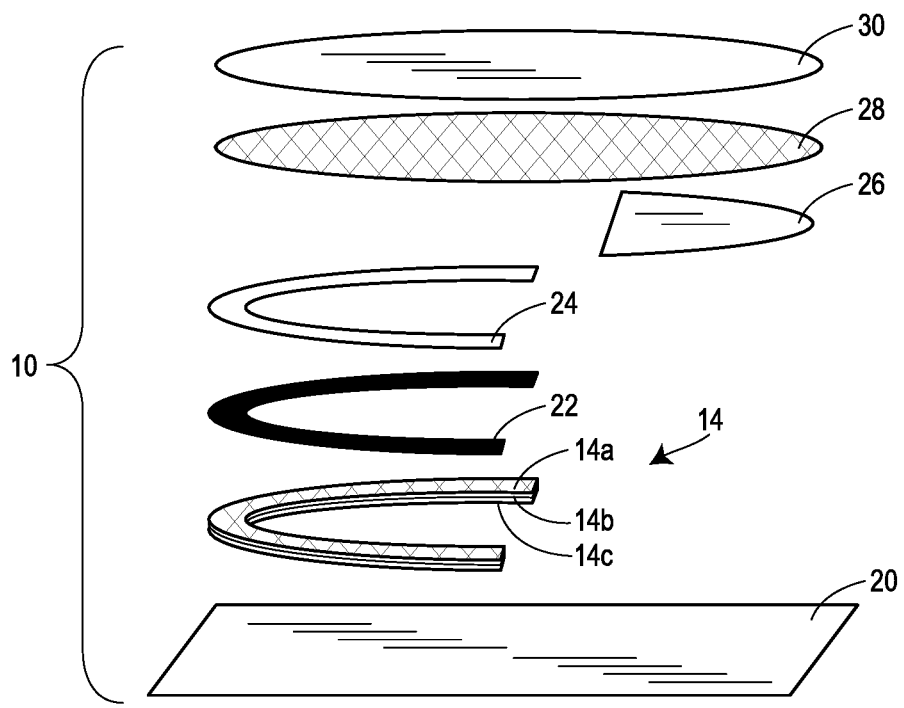
FIG. 3 is a side exploded view of a representative peel off assembly for exposing a safety feature comprising an aversive agent as adhered to a base layer or film.

Turning now to FIG. 3, the peel off assembly 10 includes a first adhesive layer 14c. The first adhesive layer 14c contacts and thereby secures the peel off assembly 10 to a base layer 20, which may comprise a carrier surface, for example, a plastic film, a coated paper sheet such as a wax paper sheet, or a laminate including a top layer comprising a plastic film or a coated paper, or the base layer may comprise a battery surface, such as a battery terminal 18, 19 (e.g., corresponding to the anode or the cathode of the battery), when the peel off assembly 10 is adhered to a battery. The plastic film, coated paper sheet, or laminate 20 may be used during manufacturing and transportation of the peel off assembly 10. The peel off assembly 10 may be readily removed from the carrier surface (e.g., plastic film, coated paper sheet, or laminate) before securing the peel off assembly 10 to a battery 12.

The first adhesive layer 14c may be shaped to form an annulus (a complete ring around the battery 12) or a sector of an annulus (e.g., a partial ring, or arch shaped) to affix to the second outer portion 16 of the battery 12 (FIG. 1). In general, a partial ring covering between about 25% and 75% of the diameter of the battery 12 (or more specifically, a partial ring provided in the second outer portion 16 and covering between about 25% and 75% of the diameter of an inner circle concentric with the outside diameter of the battery to which the assembly 10 is to be applied) is preferred for ensuring/facilitating electrical contact between batteries 12 arranged in series. By affixing to the second outer portion 16 of the battery 12, the first adhesive layer 14c avoids the no print zone 13 of the battery 12, thus avoiding deleterious contact interference between the negative terminal 18 (or the positive terminal 20 in other embodiments) and a device to be powered by the battery 12. Additionally, the shape and relative positioning of the first adhesive layer 14c allows multiple batteries 12 to be arranged in series in a device if needed; thus, the electrical contact between the respective positive and negative battery poles of two batteries 12 in series is not prevented by the first adhesive layer 14c. In some embodiments, the first adhesive layer 14c and/or double-sided tape 14 is shaped such that an angle of the sector is less than or equal to 360 degrees, for example, less than or equal to 180 degrees. In other embodiments, the first adhesive layer 14c and/or double-sided tape 14 is provided as a complete ring around the battery 12 within the second outer portion 16.

In the illustrated embodiment, the first adhesive layer 14c is provided by a double-sided tape 14 comprising the first adhesive layer 14c, a carrying substrate 14b (typically, a polymer film), and a further adhesive layer 14a. In other embodiments, the first adhesive layer 14c is provided as a discrete layer. The double-sided tape advantageously provides structural rigidity to the safety feature comprising an aversive agent applied there over and coupled thereto. In some embodiments, the adhesives of the first adhesive layer 14c and the further adhesive layer 14a are a relatively high surface energy adhesive. The relatively high energy adhesive may be substantially free of polyvinyl acetate and/or substantially free of polyvinyl alcohol. The term "substantially free" refers to adhesive compositions that contain less than 10% by weight, less than 5% by weight, less than 3% by weight, less than 2% by weight, less than 1% by weight, and/or less than 0.5% by weight of polyvinyl acetate and/or polyvinyl alcohol in the adhesive composition. A relatively high energy adhesive is useful because it bonds well to high energy surfaces such as metals and facilitates wetting of formulations or inks comprising water-soluble materials deposited thereon. Suitable adhesives for the first adhesive layer 14c include but are not limited to printable acrylic and modified acrylic adhesives, such as, for example, those sold as 3M™ Press Printable Label Materials (3M, St. Paul, Minn.) including 3M™ Adhesive 350, 3M™ Adhesive P1212, and 3M™ High Performance Permanent Tackified Adhesive P1410, those sold as NEOCRYL® solid acrylics (DSM) including NEOCRYL® B-723 and NEOCRYL® B-725 and those sold as High Peel Adhesives for Permanent Applications (Avery Dennison Corporation, Glendale, Calif.) including S8764, S8769, S8810, and S8841. Of course, other adhesives may also be used to provide the first adhesive layer 14c and the further adhesive layer 14a.

A layer comprising a colorant 22 may optionally be disposed over and coupled to the first adhesive layer 14c (or to the double-sided tape 14 providing the first adhesive layer 14). Thus, although a layer comprising a colorant 22 is shown in the illustrated embodiment, the layer comprising a colorant 22 need not be present in a peel off assembly for exposing a safety feature comprising an aversive agent 10 according to the disclosure. The layer comprising a colorant 22 may be directly or indirectly coupled to the first adhesive layer 14c (or to the double-sided tape 14 providing the first adhesive layer 14c). Direct coupling involves direct contact. Indirect coupling involves coupling through another intervening layer. When present, the layer comprising a colorant 22 is shaped and positioned substantially the same as the first adhesive layer 14c and/or double-sided tape 14 described above. More specifically, the layer comprising a colorant 22 may be shaped to form an annulus (a complete ring around the battery 12) or a sector of an annulus (e.g., a partial ring, or arch shaped) to overlay the second outer portion 16 of the battery 12 (FIG. 1). In general, as noted above, a partial ring covering between about 25% and 75% of the diameter of the battery 12 (or more specifically, a partial ring provided in the second outer portion 16 and covering between about 25% and 75% of the diameter of an inner circle concentric with the outside diameter of the battery 12 to which the assembly 10 is to be applied) is preferred for ensuring electrical contact. By overlaying the second outer portion 16 of the battery 12, the layer comprising a colorant 22 avoids the no print zone 13 of the battery 12, thus avoiding causing deleterious contact interference between the negative terminal 18 (or the positive terminal 20 in other embodiments) and a device to be powered by the battery 12. Additionally, the shape of the layer comprising a colorant 22 allows multiple batteries 12 to be arranged in series in a device if needed; thus, the electrical contact between the respective positive and negative battery poles of two batteries 12 in series is not prevented by the layer comprising a colorant 22. In some embodiments, the layer comprising a colorant 22 is shaped such that an angle of the sector is less than or equal to 360 degrees, for example, less than or equal to 180 degrees. In other embodiments, the layer comprising a colorant 22 is provided as a complete ring around the battery 12 within the second outer portion 16.

In some embodiments, the colorant comprises a dye, a pigment, a polymeric dye, or a combination thereof. The layer comprising a colorant 22 comprises a colorant (e.g., a dye, a pigment, a polymeric dye, or a combination thereof) in order to provide a clear signal to a consumer that a film is present on the battery. In some embodiments, the layer comprising a colorant and thus the colorant itself may dissolve and/or become dispersed when exposed to bodily fluid, such as saliva, to color the saliva and thus the mouth and/or other parts of the body of a person such as an infant or young child that has placed the battery 12 into his or her mouth so that an adult can readily identify the possibility that the child has ingested the battery and can take appropriate steps to help the child. In some embodiments, the layer comprising a colorant 22 comprises a water based ink. Thus, the layer comprising a colorant 22 may be provided over the layer comprising the first adhesive layer 14c by depositing a water-based ink there over. Suitable water-based inks include but are not limited to ink jet formulations comprising a colorant and a polyvinyl alcohol binder, such as, for example, those binders sold as SELVOL™ Polyvinyl Alcohol (Sekisui America Corporation, Secaucus, N.J.) and as POVAL™ Polyvinyl Alcohol (Kuraray America, Inc., Houston, Tex.). While generally any colorant may be used, in one aspect, the water based ink may comprise a black dye or a black pigment, for example, a black pigment dispersion approved for indirect food contact such as Black Shield Sp. Black Dispersion 6C11B14525 (DyStar Hilton Davis, Cincinnati, Ohio) and various colored inks sold under the AQUAFLEX tradename (Kor-Chem, Inc., Atlanta, Ga.).

A layer comprising a water-soluble material 24 is disposed over and coupled to the first adhesive layer 14. In the illustrated embodiment, the layer comprising a water-soluble material 24 is indirectly coupled to the first adhesive layer 14 through the layer comprising a colorant 22. In other embodiments, the relative positioning of the layer comprising a colorant 22 and the layer comprising a water-soluble material 24 may be reversed such that the layer comprising a water-soluble material 24 is directly coupled to the first adhesive layer 14 and the layer comprising a colorant 22 is indirectly coupled to the first adhesive layer 14 through the layer comprising a water-soluble material 24. Similar to the first adhesive layer 14 and the layer comprising a colorant 22 (when present), the layer comprising a water-soluble material 24 is be shaped and positioned substantially the same as the first adhesive layer 14c to form an annulus (a complete ring around the battery 12) or a sector of an annulus (e.g., a partial ring, or arch shaped) to overlay the second outer portion 16 of the battery 12 (FIG. 1). In general, as noted above, a partial ring covering between about 25% and 75% of the diameter of the battery 12 (or more specifically, a partial ring provided in the second outer portion 16 and covering between about 25% and 75% of the diameter of an inner circle concentric with the outside diameter of the battery to which the assembly 10 is to be applied) is preferred for ensuring/facilitating electrical contact between batteries 12 arranged in series. By overlaying the second outer portion 16 of the battery 12, the layer comprising a water-soluble material 24 avoids the no print zone 13 of the battery 12, thus avoiding causing deleterious contact interference between the negative terminal 18 (or the positive terminal 20 in other embodiments) and a device to be powered by the battery 12. Additionally, the shape and relative positioning of the layer comprising a water-soluble material 24 allows multiple batteries 12 to be arranged in series in a device if needed; thus, the electrical contact between the respective positive and negative battery poles of two batteries 12 in series is not prevented by the layer comprising a water-soluble material 24. In some embodiments, the layer comprising a water-soluble material 24 is shaped such that an angle of the sector is less than or equal to 360 degrees, for example, less than or equal to 180 degrees. In other embodiments, the layer comprising a water-soluble material 24 is provided as a complete ring around the battery 12 within the second outer portion 16.

Useful water-soluble materials have a solubility in water of greater than 50 mg/L, greater than 100 mg/L, greater than 500 mg/L, or even greater than greater than 1000 mg/L. Non-limiting examples of water-soluble materials include but are not limited to sugar, polyethers such as polyethylene glycols (PEGs) and polyethylene oxides (PEO), polyacrylic acids (PAA), polyamides (PA), polyacrylates, polyvinyl alcohols and modified polyvinyl alcohols, acrylate copolymers, polyvinyl pyrrolidone, pullulan, gelatin, carboxymethyl cellulose (CMC), hydroxylpropylmethyl cellulose (HPMC), hydroxypropylcellulose, polysaccharides, natural polymers including, but not limited to, agar, guar gum, xanthan gum, locust bean gum, carrageenan, and starch, modified starches including, but not limited to, ethoxylated starch and hydroxypropylated starch, copolymers of the foregoing, salts thereof, and combinations of any of the foregoing. The water soluble material preferably is a biologically inert material, with no toxicity or little toxicity. Suitable water-soluble materials include but are not limited to water-soluble films sold under the ADVASOL™ trade name (Sekisui America Corporation, Secaucus, N.J.) and polyvinyl alcohol-based films (MonoSol LLC, Merrillville, Ind.).

The layer comprising a water-soluble material 24 comprises an aversive agent. Generally, the aversive agent comprises a bitterant. In some embodiments, the water-soluble material comprises greater than about 200 ppm, for example, between about 200 ppm and 20000 ppm, such as about 500 ppm, about 1000 ppm, about 2500 ppm, about 5000 ppm, about 10000 ppm, about 15000 ppm, or about 20000 ppm of the aversive agent, e.g., denatonium benzoate. In other embodiments, the water-soluble material may comprise ammonium benzoate, denatonium benzoate, denatonium saccharide, denatonium chloride, sucrose octaacetate, 2,3-dimethoxystrychnine, quassinoids, flavonoids, quercetin, absinthin, resinferatoxin, capsaicin, nonivamide, piperine, allyl isothiocyanate, or a combination of the foregoing.

A kill strip layer 26 is disposed between a second adhesive layer 28 and the base layer 20 (e.g., a carrier surface, or a pole 18 or 19 of the battery 12) Because the kill strip layer 26 is non-adhesive on one side, the kill strip layer 26 facilitates grasping of a portion thereof in a manner that allows the second adhesive layer 28 to be released or decoupled from the layer comprising the water-soluble material 24 and/or the layer comprising a colorant 22 (when present) when a peel force sufficient to overcome any bonding interaction between the second adhesive layer 28 and the layer comprising the water-soluble material 24 and/or the layer comprising a colorant 22 is applied. As used herein, the term "kill strip layer" refers to a film, layer, or tape having at least one surface that renders other substrate surfaces in contact therewith non-adhering. Thus, the kill strip layer may be positioned between a first substrate or surface and a second substrate or surface (e.g., an adhesive layer) and oriented towards the second substrate or surface to prevent or significantly reduce adhesion between the film, layer, or tape and the second substrate. In some embodiments, the peel force (as measured on stainless steel) is between 2 N and 12 N. The kill strip layer 26 at least partially overlays the first inner portion 13, e.g., the no print zone, of the battery 12, but may also overlay the layer comprising the water-soluble material 24, the layer comprising a colorant 22 (when present), or portions thereof. In the illustrated embodiment, the kill strip layer 26 does not overlay any of the layer comprising the water-soluble material 24 or the layer comprising a colorant 22.

In one embodiment, the kill strip layer 26 comprises the shape of a segment of a circle (i.e., an area formed by a chord of a circle and an arc of a circle), but of course, the kill strip layer may be provided in other shapes/forms. In one particular aspect, the kill strip comprises a minor segment of a circle, i.e., the kill strip layer 26 comprises an area that is less than one half of an area of the second adhesive layer 28 or a label 30. In other embodiments, the kill strip layer 26 may comprise an area that is greater than or equal to one half of an area of the second adhesive layer 28 or the label 30.

In some embodiments, the kill strip layer 26 comprises a non-metalized polyester. The non-metalized polyester advantageously allows the kill strip layer 26 to have a colored surface (e.g., red colored) facing downwardly towards the carrier layer 20 so that it may be easily identified by the consumer in the final peel off assembly 10 described herein, so as to facilitate removal of the label 30 (when present), the second adhesive layer 28, and the kill strip layer 26 from a sub-assembly comprising the layer comprising a water-soluble material 24, the layer comprising a colorant 22, and the layer comprising the first adhesive layer 14 when an appropriate peel force is applied to the kill strip layer 26. In other embodiments, the kill strip layer 26 may comprise a metalized polyester such as silver mylar, or other metalized films.

The second adhesive layer 28 is disposed over and coupled to the kill strip layer 26, and in the illustrated embodiment a label 30 is disposed over and coupled to the second adhesive layer 28. As described above, the label 30 (when present), the second adhesive layer 28, and the kill strip layer 26 are removable from a sub-assembly comprising the layer comprising a water-soluble material 24 and the layer comprising a colorant 22 (when present) when a sufficient peel force is applied to the kill strip layer 26.

In some embodiments, the second adhesive layer 28 is provided on a film comprising a biaxially-oriented polypropylene, polypropylene, polyethylene terephthalate, biaxially-oriented polyethylene terephthalate, polyester, polyolefin, polyethylene, coextrusions, laminates, and combinations thereof. For example, the second adhesive layer 28 may be a solvent acrylic adhesive provided on one side of a film comprising a material such as for example biaxially-oriented, coextruded polypropylene. In the illustrated embodiment, the adhesive is disposed downwardly towards the battery pole 18, 19 such that the biaxially-oriented film is able to receive printing directly, or a safety label 30 (which need not be present). In one embodiment, the second adhesive layer 28 comprises a 2.3 mil thick biaxially-oriented, coextruded polypropylene film including an acrylic adhesive (Fasson® 2.3M White BOPP TC/R143/ 1.2 M PET, Avery Dennison). The second adhesive layer 28 may have a peel adhesion or peel force on stainless steel of between 2 N and 12 N, for example, the second adhesive layer may have a peel force on stainless steel of about 8 Newtons (1.8 lbs). As used herein, the term "peel force" refers to the peak load for a 90° pull at a constant rate/speed until removal of the tab from the surface of a stainless steel plate in accordance with ASTM-D6862. When the peel force for the second adhesive layer is in the foregoing range, the inventors have surprisingly found that the layer comprising the water soluble material 24, the layer comprising a colorant 22 (when present), and the first adhesive layer remain in position on the battery despite the initial adhesion of the second adhesive layer 28 thereto and the subsequent removal of the sub-assembly comprising the kill strip layer 26, the second adhesive layer 28, and the label (if present) therefrom.

The label 30 may serve as a safety awareness sticker. For example, the label 30 may include text and/or indicium that describe the safety features of the peel off assembly 10. For example, the label 30 may include a description of one or both of the water-soluble material layer 24 and the layer comprising a colorant 22. In some embodiments, the label 30 may include indications that swallowing may cause a gag reflex. Alternatively, or additionally, the label 30 may include indications that a colored stain deposited on a child's skin may indicate accidental ingestion.

The kill strip layer 26 advantageously acts as a dead zone (i.e., no adhesive contact with the layer comprising a water-soluble material 24 or the layer comprising the colorant 22) that allows the consumer to easily grasp a portion of the kill strip layer 26 and to peel the kill strip layer 26, thus removing a sub-assembly comprising the kill strip layer 26, the second adhesive layer 28, and the label 30 (when present), to expose the battery terminal 18 for use in a device to be powered by the battery 12.

Figure 4:
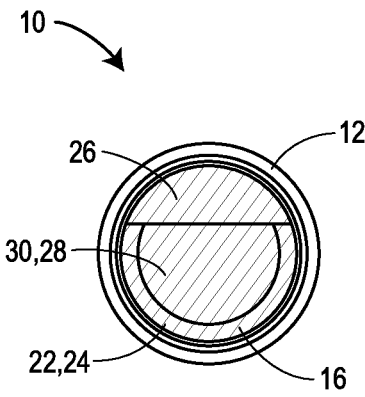
FIG. 4 is a top view of a battery cell including the peel off assembly for exposing a safety feature comprising an aversive agent of FIG. 1 as adhered to a battery pole.
Figure 5:
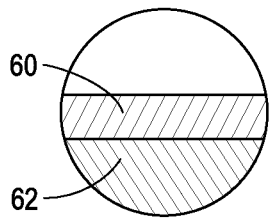
FIG. 5 is a side view of the battery cell of FIG. 4.
Figure 6:
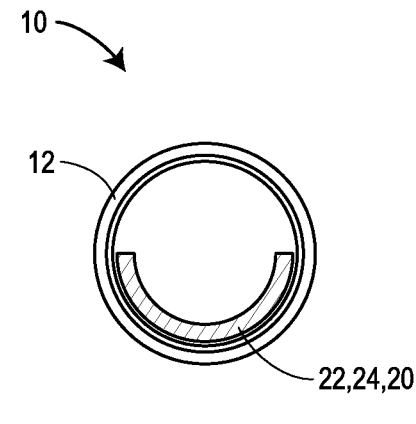
FIG. 6 is a top view of the battery cell of FIG. 4 with a label layer, a second adhesive layer, and a kill strip layer of the peel off assembly for exposing a safety feature comprising an aversive agent of FIG. 1 not shown.
Figure 7A:
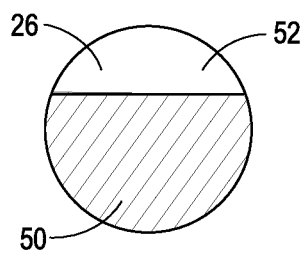
FIGS. 7A-7E are schematic representations of certain adhesion zones of the peel off assembly for exposing a safety feature comprising an aversive agent of FIGS. 3-6.
Figure 7B:
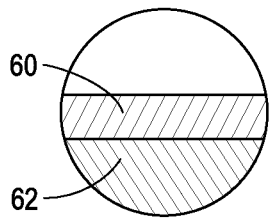
Figure 7C:
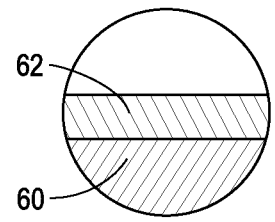
Figure 7D:
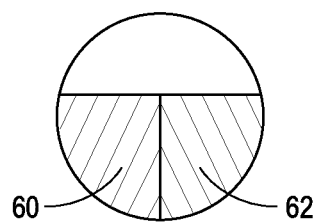
Figure 7E:
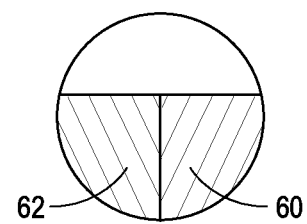

FIGS. 4-6 illustrate the peel off assembly 10 in various states on the battery 12. FIG. 4 illustrates the peel off assembly 10 before the sub-assembly comprising the kill strip layer 26, the second adhesive layer 28, and the label 30 is removed. The label 30 and the second adhesive layer 28 overlie, at least partially, both the first inner portion 13 and the second outer portion 16, while the layer comprising a water-soluble material 24 and the layer comprising a colorant 22 overlie only part of the second outer portion 16 (i.e., only a partial ring is formed in the illustrated embodiment, but the layer comprising a water-soluble material 24 and the layer comprising a colorant 22 may be provided in any suitable pattern/shape that does not interfere with electrical contact between the terminal 18, 19 and a device to be powered by the battery 12). The kill strip layer 26 also overlies parts of both the first inner portion 13 and the second outer portion 16, thereby forming a pull tab for a consumer as described herein. FIG. 5 is a side view of the peel off assembly 10 of FIG. 4.

Once the consumer grasps the kill strip layer 26 and applies sufficient peel force, a sub-assembly comprising the kill strip layer 26, the second adhesive layer 28, and the label 30 (when present) is separated from the layer comprising a water-soluble material 24 and the layer comprising a colorant 22 (when present). Subsequent to removal of the sub-assembly, the layer comprising a water-soluble material 24 and the layer comprising a colorant 22 (when present) remain attached to the battery 12 through coupling to the first adhesive layer 14. The layer comprising a water-soluble material 24 and the layer comprising a colorant 22 are now exposed and may dissolve, at least partially, upon contact with bodily fluids and thus be available to serve as safety features.

Turning now to FIGS. 7A-7E, the disclosed peel off assembly 10 advantageously produces good peel strength with adequate adhesion of the layer comprising a water-soluble material 24 and the layer comprising a colorant 22 (when present) on the battery 12 after removal of a sub-assembly comprising the kill strip layer 26, the second adhesive layer 28 and the label 30 from the battery 12. For example, the second adhesive layer 28 is initially fully adhered to the base layer 20 (e.g., a pole 18 or 19 of the battery 12) over 100% of a first area 50. The kill strip layer 26 prevents adhesion over a second area 52. For the peel off assembly 10 to demonstrate sufficient adherence in use, it has been found the second adhesive layer 28 should remain adhered to at least 50% of the first area 50 after 14 days, thus retaining the label 30 on the battery 12 until the peel force is applied to the kill strip layer 26. For illustration, the second adhesive layer 28 may remain 50% adhered to the first area 50 in any continuous 50% area. For example, FIGS. 7B-7E illustrate different adherence regions 60 and non-adherence regions 62 that produce an overall 50% adherence in the first area 50.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A peel off assembly for exposing a safety feature comprising an aversive agent for a battery, the peel off assembly comprising:
    a first adhesive layer adhered to a base layer;
    optionally, a layer comprising a colorant disposed over and coupled to the first adhesive layer;
    a layer comprising a water-soluble material and an aversive agent disposed over and coupled to the first adhesive layer;
    a second adhesive layer disposed over and coupled to the layer comprising a water-soluble material; and
    a kill strip layer disposed between the second adhesive layer and the base layer;
    optionally, a label disposed over and coupled to the second adhesive layer,
    wherein the second adhesive layer is adapted and arranged to release from the layer comprising the water-soluble material, when a peel force is applied such that the second adhesive layer and the kill strip layer are removable from the layer comprising a water-soluble material when the peel force is applied to the second adhesive layer.

2. The peel off assembly of to claim 1, wherein the label is present.

3. The peel off assembly of claim 2, wherein the base layer comprises a plastic film, a coated paper sheet, a laminate, or a combination thereof.

4. The peel off assembly of claim 2, wherein the base layer comprises a battery pole.

5. The peel off assembly of claim 4, wherein the base layer comprises a negative terminal of a battery.

6. The peel off assembly of claim 1, wherein the layer comprising a colorant is present and the colorant comprises a dye, a pigment, a polymeric dye, or a combination thereof.

7. The peel off assembly of claim 1, wherein there are no additional layers between the kill strip layer and the base layer.

8. The peel off assembly of claim 1, wherein the aversive agent comprises a bitterant.

9. The peel off assembly of claim 1, further comprising a battery having a pole, the pole having a first inner portion and a second outer portion, and wherein the first adhesive layer is coupled to the second outer portion.

10. The peel off assembly of claim 9, wherein the second outer portion comprises an annular shape and the layer comprising a water-soluble material has the shape of an annular sector.

11. The peel off assembly of claim 10, wherein the annular sector has an angle that is less than or equal to 180 degrees.

12. The peel off assembly of claim 9, wherein the first inner portion comprises a no print zone of the battery pole.

13. The peel off assembly of claim 12, wherein first inner portion has a circular shape comprising a diameter of about 11 mm or less.

14. The peel off assembly of claim 1, wherein the kill strip layer comprises the shape of a circular segment.

15. The peel off assembly of claim 14, wherein the circular segment comprises an arc of less than 180 degrees.

16. The peel off assembly of claim 15, wherein the kill strip layer comprises an area that is equal to or less than one half of an area of the second adhesive layer.

17. The peel off assembly of claim 1, wherein the first adhesive layer comprises a high surface energy acrylic adhesive.

18. The peel off assembly of claim 17, wherein the first adhesive layer is substantially free of polyvinyl alcohol.

19. The peel off assembly of claim 1, wherein the second adhesive layer comprises a solvent acrylic adhesive.

20. The peel off assembly of claim 1, wherein the layer comprising a colorant comprises a water based ink.

21. The peel off assembly of claim 20, wherein the water based ink comprises a black dye.

22. The peel off assembly of claim 1, wherein the kill strip layer comprises a non-metalized polyester.

23. The peel off assembly of claim 1, wherein the water-soluble material comprises between about 200 ppm and 20000 ppm Denatonium Benzoate.

24. A battery safety system comprising:
    a battery having a can, a first terminal and a second terminal; and
    a peel off assembly for exposing a safety feature comprising an aversive agent, the peel off assembly including a first adhesive layer adhered to one of the first or second terminals; optionally, a layer comprising a colorant disposed over and coupled to the first adhesive layer; a layer comprising a water-soluble material and an aversive agent disposed over and coupled to the first adhesive layer; a second adhesive layer disposed over and coupled to the layer comprising a water-soluble material; a kill strip layer disposed between the second adhesive layer and the one of the first and second terminals, and, optionally, a label disposed over and coupled to the second adhesive layer, wherein the second adhesive layer is adapted and arranged to release from the layer comprising a water-soluble material when a peel force is applied thereto such that the second adhesive layer and the kill strip layer are removable from the layer comprising a water-soluble material.

\* \* \* \* \*